United States Patent [19]

Highland

[11] 4,169,522

[45] Oct. 2, 1979

[54] SKIP BRAKE UNITS

[76] Inventor: Stanley E. Highland, 316 Willington Ave., Chilliwack, British Columbia, Canada, V2P 2E4

[21] Appl. No.: 877,069

[22] Filed: Feb. 13, 1978

[51] Int. Cl.² .............................................. B61H 9/02
[52] U.S. Cl. .................................... 188/65.2; 182/14; 182/36; 182/150; 188/44; 188/65.1; 188/106 P; 188/140 R; 188/196 M
[58] Field of Search .................. 188/65.1, 65.2, 106 P, 188/42, 43, 44, 30, 140 R, 142, 144, 196 M, 72.7, 72.9; 182/14, 17, 36, 150, 10

[56] References Cited

U.S. PATENT DOCUMENTS

| 3,017,958 | 1/1962 | Richter | 188/43 |
| 3,194,349 | 7/1965 | Kershner et al. | 188/72.7 X |
| 3,369,501 | 2/1968 | Tsuchimochi | 105/150 |
| 3,406,793 | 10/1968 | Buyze | 188/72.9 X |
| 3,451,507 | 6/1969 | Santos | 188/44 |
| 3,635,315 | 1/1972 | Shalders | 188/44 X |

FOREIGN PATENT DOCUMENTS 15442 of 1894 United Kingdom ...................... 188/44

*Primary Examiner*—George E. A. Halvosa
*Attorney, Agent, or Firm*—Townsend and Townsend

[57] ABSTRACT

A brake unit for a skip or carriage adapted to ride on one or more cables. The brake unit has brake jaws spanning the cable, said unit being connected to the skip so as to move along the cable therewith. The connection to the skip is such that when the latter is moved in one direction, the jaws slide along the cables, but when the skip moves in the opposite direction, the jaws grip the cable in a braking action. The brake unit has adjusting means which is operable to adjust the gripping action of the jaw anywhere from a complete grip preventing movement of the skip to release of the cable so that the skip can move freely therealong.

7 Claims, 6 Drawing Figures

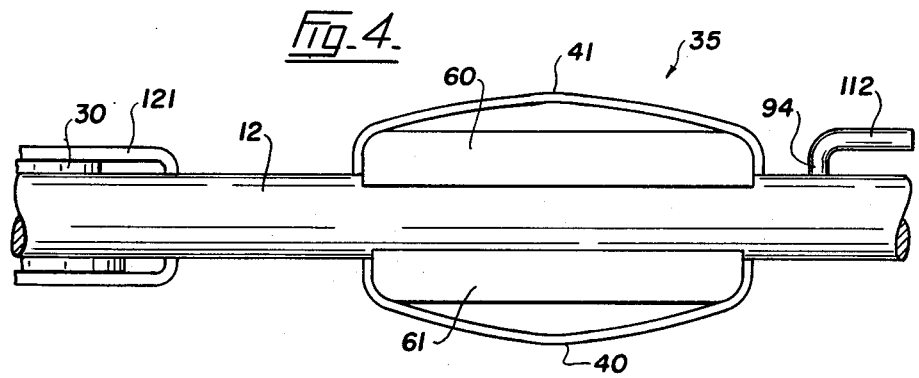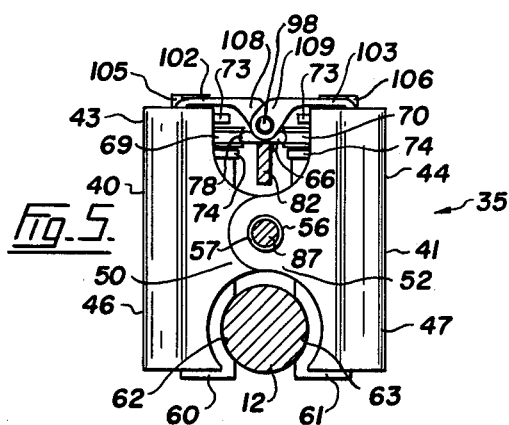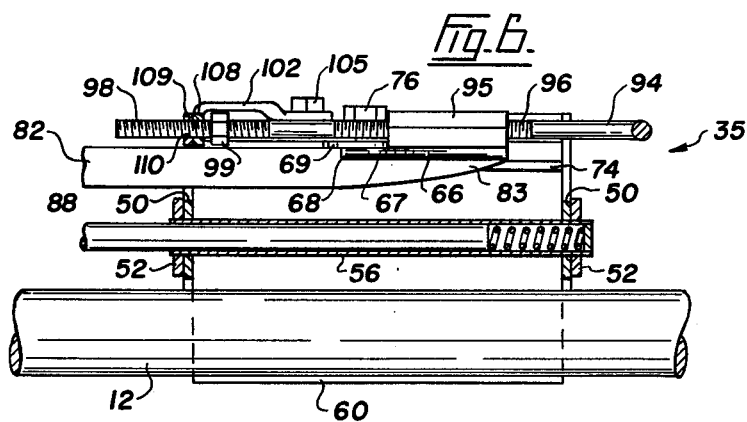

SKIP BRAKE UNITS

FIELD OF THE INVENTION

This invention relates to brake units for skips, carriages or the like which travel along one or more cables, rods, rails or the like.

DESCRIPTION OF THE PRIOR ART

The present brake unit is designed particularly for use with skips or carriages for travelling along line cables, such as electricity transmittion lines. However, as the brake means may be used for other vehicles, it is to be understood that the term "skip" is intended to include any type of vehicle travelling along lines, rods or rails, and that the term "cable" is intended to include rods, rails and the like. For the sake of convenience, this invention is described and illustrated herein in association with a skip of the type illustrated in applicant's U.S. Pat. No. 3,702,124, dated Nov. 7, 1972. Skips of this nature are suspended from pulleys which ride on line cables. As these skips usually run on pairs of line cables, there preferably is at least one of these brake units connected to the skip and riding on each line cable.

The skip may have power means for driving it along the cables, or as is more commonly the practice, the skip is pulled along the cable by an operator standing in the skip. The power lines along which these skips travel usually extend in long loops between towers. This means that the skip is pratically always moving uphill or downhill. In other words, the skip is usually on an incline, and the operator has to hang on to the cables to prevent the skip from running downhill when this is not desired. For example, when the operator wishes to work on or around the power lines, the skip has to be held against movement, and when it is travelling downhill, it is necessary to prevent the skip from moving too fast.

As far as the applicant is aware, there is no satisfactory brake unit for automatically holding a skip in place on the power cables when the latter are released, or for controlling the downhill speed of the skip.

SUMMARY OF THE INVENTION

A brake unit in accordance with this invention has jaws spanning or riding on a cable along which the skip is moved. The unit is connected to the skip to move therewith. When the skip is moved in one direction, for example uphill, the brake unit travels freely along the cable. However, if the skip starts to move downhill at this time, the unit jaws automatically grip the cable to prevent such movement. Movement of the skip in the uphill direction automatically releases the jaws from the cable-gripping position. The brake unit can be adjusted to allow the brake jaws to slide on the cable while maintaining a desired degree of grip thereon so as to keep the skip from moving too fast. The adjusting means on the brake unit can be operated to cause the brake jaws firmly to grip the cable so as to prevent any movement of the skip, and anywhere from there to a point where the brake jaws allows these skips to travel freely along the cable.

A brake unit according to this invention comprises a pair of elongate substantially parallel and opposed brake members, pivot means interconnecting the brake members between first sections and second sections thereof, opposed brake jaws on the second sections, movement of said first sections towards each other moving said second sections and the jaws thereof away from each other to receive a cable extending longitudinally therebetween, and movement of the first sections away from each other moving the second sections and the jaws towards each other to grip said cable in a braking operation, spreading means between said first sections of the brake members and movable to spread said first sections apart, and operator means connected to said spreading means between the brake members and adapted to be connected to a skip riding on said cable, whereby movement of the skip along the cable in one direction shifts said operator means to move the spreading means to spread apart the first sections of the brake members and cause the brake jaws to grip the cable, and movement of the skip in the opposite direction shifts said operator means to reduce the grip of the brake jaws on the cable.

BRIEF DESCRIPTION OF THE DRAWINGS

A preferred form of this invention is illustrated by way of example in the accompanying drawings, in which:

FIG. 4 is a bottom view of the unit, FIG. 5 is a cross section taken on the line 5—5 of FIG. 3 showing the brake unit in end elevation, and FIG. 6 is a longitudinal and vertical section on the line 6—6 of FIG. 3.

DESCRIPTION OF THE PREFERRED EMBODIMENT

Figure 1:
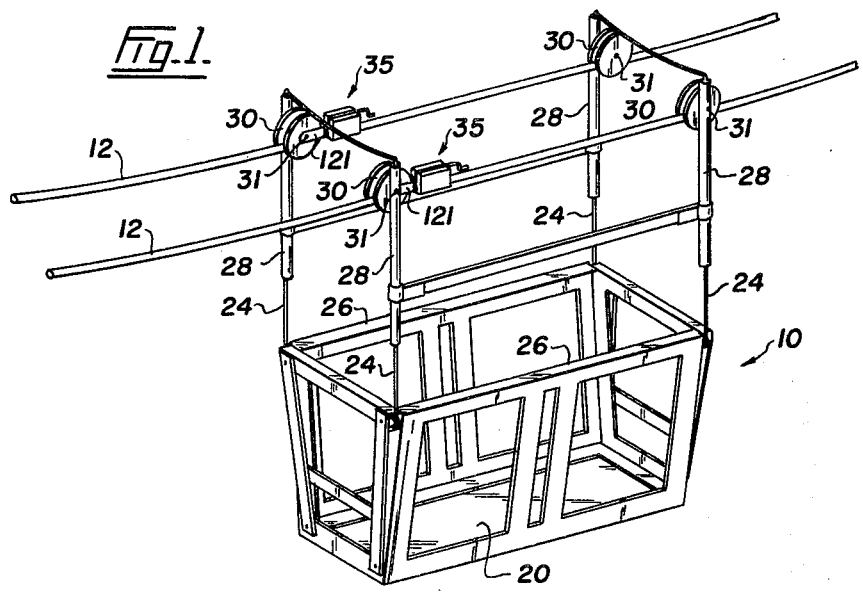
FIG. 1 is a diagrammatic perspective view of a skip on cables and having brake units in accordance with this invention connected thereto.

Referring to the drawings, 10 is a line or cable travelling skip mounted to travel on a pair of laterally spaced line cables 12. The illustrated skip 10 includes a carriage or basket 20 suspended by cables 24 from a pair of side members 26, each of said members having a pair of vertical supports 28, one near and above each end of the carriage. A pulley 30 is mounted on an axle 31 connected to and extending inwardly from each support 28 near the upper end thereof.

When skip 10 is in use, the pulleys 30 ride on the line cables 12, and an operator stands on carriage 20 and pulls himself along the cables. If the carriage is travelling uphill, the operator has to pull himself in the upward direction while preventing the skip from rolling in the opposite direction, and when the skip is travelling downhill, the operator has to keep the skip from travelling too fast.

The skip 10 is provided with one or more brake units 35 of this invention. FIG. 1 shows a brake unit 35 near each pulley 30 at one end of the skip. However, there may be only one of these brake units, or there may be a brake unit for each pulley. The brake units are shown extending longitudinally inside the vertical supports 28 of the skip, and this is the preferred position, but the brake units can extend longitudinally outside the vertical supports.

In the preferred form of the invention, the brake unit 35 includes a pair of elongate substantially parallel and opposed brake members 40 and 41 (see substantially FIGS. 3 and 5) which are hingedly connected together and have respective outer first sections or handles 43 and 44 and inner second sections or brake jaws 46 and 47. These brake members are substantially U-shaped in cross section and member 40 has end portions 50 and 51 extending inwardly therefrom and overlapping end portions 52 and 53 of side member 41. The end portions 50, 52 and end portions 51, 53 are hingedly or pivotably connected together by suitable pivot means. In this example, a tube 56 extends longitudinally between the brake members and freely through registering holes 57 in the overlapped portions 52. By referring to FIG. 2, it will be seen that tube 56 is substantially midway between the upper and lower edges of the brake members 40, 41. With this arrangement, when the handles 43 and 44 are moved towards each other, the jaws 46 and 47 move away from each other, and vice versa. The brake jaws 46 and 47 are provided on their inner surfaces with removable brake blocks or shoes 60 and 61 having opposed grooves 62 and 63 therein, see FIG. 5, to receive and fit around one of the cables 12.

Spreading means is provided between the first sections or handles 43, 44 of brake members 40, 41, said spreading means being movable to spread these sections or handles apart, and operator means is connected to the spreading means between the brake members and is adapted to be connected to skip 10 riding on cables 12.

In this example the spreading means comprises a spreader in the form of a wedge or spreader plate 66 which extends longitudinally of the brake unit and has inclined edges 67 extending back from a tip 68 which is normally positioned between a pair of bearings or rollers 69 and 70 mounted on or connected to the brake members 40 and 41, respectively. In this example, a pair of vertically spaced supports 73 and 74 project inwardly from each of the handles 43 and 44, and the rollers 69 and 70 are mounted on vertical pins 76 extending between these supports, each roller being between a pair of supports, as shown in FIG. 5. The rollers 69, 70 have peripheral grooves 78 through which the edges 67 of spreader plate 66 extend.

The operator means comprises a bar 82 having an inner end 83 extending beneath and connected to the wedge or spreader plate 66 (see FIG. 6). This plate is in a generally horizontal plane, and bar 82 extends parallel to this plane and out from between the brake members 40, 41 to an outer end 84 which is adapted to be connected to a portion of skip 10. A connector 86 is secured to the outer end 84 of bar 82 and extends downwardly therefrom, the lower end of this connector being fixedly connected to the outer end 87 of a guide pin 88 which extends inwardly relative to the brake members and slidably fits in tube 56. This tube 56 and the guide pin 88 extend substantially parallel to the plane of spreader plate 66.

Figure 2:
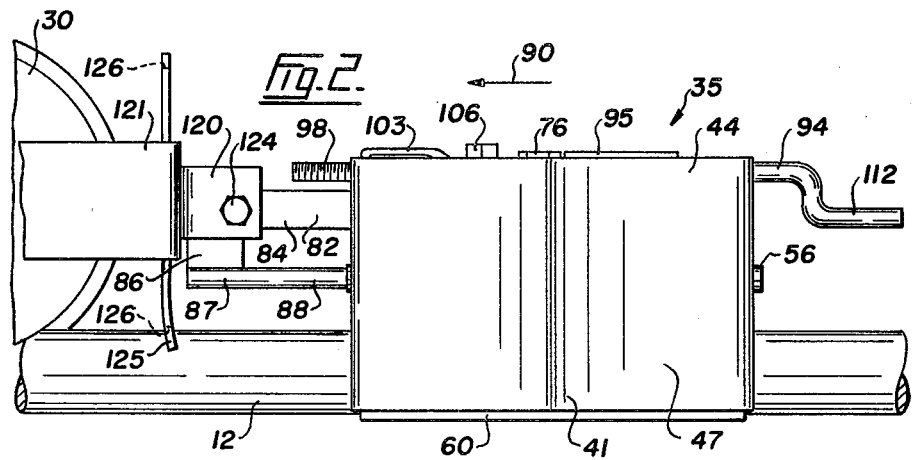
FIG. 2 is an enlarged side elevation of a brake unit connected to a portion of the skip.
Figure 3:
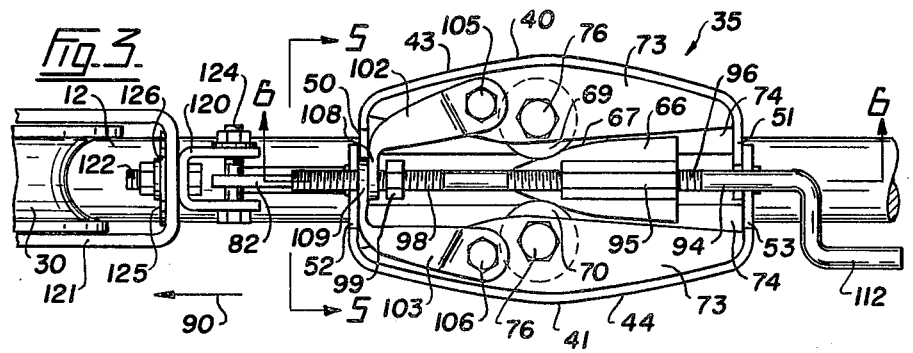
FIG. 3 is a plan view of the brake unit.

With the arrangement described so far, when bar 82 is drawn outwardly in the direction of arrow 90 in FIGS. 2 and 3, the spreader plate 66 is drawn in the same direction against bearings 69, 70 to spread the handles 43, 44 apart and thereby move the brake jaws 46, 47 and their respective brake shoes 62, 63 inwardly to grip the cable therebetween. When bar 82 is moved in the opposite direction, spreader plate 66 moves back to allow handles 43 and 44 to move towards each other and thereby release the grip of the brake jaws on the cable.

Suitable means is provided for adjusting the degree of grip of the brake jaws on the cable anywhere from a firm grip thereon to prevent movement of the brake unit along the cable to a position where the brake jaws provide no resistance to the movement of the brake unit. This adjusting means comprises a shaft 94 extending longitudinally between the brake members 40, 41 substantially parallel to the plane of the spreader plate 66. A relatively long nut 95 is threaded on a threaded portion 96 of the shaft 94 immediately above spreader plate 66, this nut being secured to the spreader plate in any suitable manner, such as by welding. This threaded portion has a thread of a desired hand, for example, right hand, and the shaft is provided with another threaded portion 98 having threads of the opposite hand, for example, left hand. A nut 99 is threaded on this threaded portion 98. This nut constitutes stop means on the shaft adapted to bear against a suitable stop connected to the brake members.

In this example, the stop comprises a pair of arms 102 and 103 connected at inner ends of the brake members 40 and 41, respectively, by bolts 105 and 106 which are threaded down through the adjacent pair of supports 73 and 74. The arms 102 and 103 extends towards one end of the brake members 41, and have overlapping lugs 108 and 109 at their outer ends, and the adjacent end of shaft 94 extends freely through registering holes 110 in said lugs.

A handle 112 is secured to the opposite end of shaft 94 outside the brake members. Handle 112 is used to rotate the shaft.

As stated above, the outer end of bar 82 is adapted to be connected to a portion of the skip 10. In this example, clevises 120 and 121 are used for this purpose. These clevises face in opposite directions and are connected together by a swivel pin 122. Clevis 120 is connected by a bolt 124 on the outer end 84 of bar 82, while the arms of clevis 121 are swingably mounted on an extension of the axle 31 of an adjacent pulley 30 of the skip. A bonding or grounding strap 125 is connected to the back of clevis 121 and has ends projecting above and below this clevis with notches 126 in said ends. The downwardly-projecting end of strap 125 is long enough to engage cable 12 with the latter fitting in the notch 126 thereof. This mounting strap drags along the cable as the skip moves therealong to ground the skip to the cable so that the skip and all the parts associated therewith have a common potential.

In FIG. 1, each brake unit 35 is located inside the vertical support 28 of its pulley 30. The brake unit can be swung upwardly and over to a position outside the adjacent vertical support, the mounting of clevis 121 on axle 31 making this possible, and at this time, the brake unit is turned over so that the brake jaws thereof can span the cable, swivel pin 122 between clevises 120 and 121 making this possible.

In FIG. 1, the skip 10 is moving downhill on cables 12, and the brake units are drawn in the same direction through bars 82. This tends to draw spreader plate 66 forwardly to spread the handles 43, 44 apart to cause the brake jaws 46, 47 to grip the cable. In order to prevent this braking action, handle 112 is turned to rotate the shaft 94 to cause the spreader plate to move forwardly between bearing or rollers 69, 70. Thus, the speed of the skip can be controlled by means of the handle, and the skip can be stopped by moving the spreader plate forwardly far enough. The handle 112 can be turned in the opposite direction to move the spreader plate rearwardly to allow the handles to move towards each other thereby relaxing the grip of the brake jaws on the cable. If the spreader plate is moved rearwardly a small distance, the brake jaws will slide along the cables to allow the skip to move relatively slowly. The nut 99 bearing against stop lugs 108 and 109 prevents the spreader plate from being drawn forwardly beyond its adjusted position. The speed of travel of the skip can be increased by moving the spreader plate further in the rearward direction.

If the skip is pulled back up the inclined cables, the bar 82 is moved inwardly relative to the brake members so that spreader plate is moved back to release the handles of these brake members, at which time the brake jaws merely slide along the cables.

If desired, the brake units 35 may be swung to their outer position outside the vertical supports 28 of the skip. With this arrangement, movement of the skip forwardly causes each bar 82 to move inwardly to shift the spreader plate 66 so as to allow the brake member handles to move towards each other, at which time the brake jaws slide along the cables. The handle 112 may be rotated to set the spreader plate 66 so that if the skip is released and tends to roll back down the cable, the spreader plate moves the handles away from each other to cause the jaws to grip the cable. If it is desired to allow the skip to travel backwards under control, handle 112 is rotated to relieve the pressure of the spreader plate against the bearings of the brake members thus releasing the pressure of the brake jaws on the cables.

What I claim is:

1. A brake unit for skips or the like travelling on cables comprising:
    a pair of elongate substantially parallel and opposed brake members,
    handles at outer edges of the brake members and brake jaws at inner edges thereof, movement of said handles towards each other moving said jaws away from each other to receive a cable extending longitudinally therebetween, and movement of the handles away from each other moving the jaws towards each other to grip said cable in a braking operation,
    opposed bearings on said handles between the brake members,
    a wedge-shaped spreader plate between the brake members and mounted for movement in a first direction in a plane extending across said members to engage said bearings and spread the handles apart and for movement in an opposite second direction to allow said handles to be moved towards each other,
    pivot means interconnecting the brake members between said handles and said inner edges, said pivot means comprising a tubular guide carried by said brake members parallel to said plane, and a guide pin for and connected to said spreader plate and riding in said tubular guide, and
    an operator bar having one end connected to said spreader plate and an opposite outer end extending outwardly from the brake members and adapted to be connected to a skip riding on said cable,
    whereby movement of the skip along the cable in the direction away from the brake members moves said spreader plate by means of said bar in said first direction to spread the handles apart to cause the brake jaws to grip the cable and movement of the skip in the direction towards the brake members moves the spreader plate in said second direction to allow the handles to move towards each other to reduce the grip of the brake jaws on the cable.

2. A brake unit as claimed in claim 1 comprising adjusting means connected to said spreader plate adjustably to limit the amount of movement of the spreader plate in said first direction.

3. A brake unit as claimed in claim 2 in which said adjusting means comprises a nut connected to the spreader plate, and a shaft carried by the brake members and having a threaded section extending through and in engagement with the nut, said shaft extending parallel to said plane.

4. A brake unit as claimed in claim 3 comprising stop means connected to said brake members, said shaft extending freely through said stop means, a second threaded section on the shaft of a hand opposite to the hand of the first-mentioned threaded section of the shaft, and a nut threaded on said second threaded section and positioned to bear against said stop means when the shaft is rotated.

5. A brake unit as claimed in claim 4 comprising a handle connected to an end of said shaft by means of which the shaft may be turned.

6. A brake unit as claimed in claim 4 in which said stop means comprises:
    a pair of arms each having an inner end connected to one of said brake members spaced from an end thereof, said arms having outer ends extending towards said end of the brake members,
    a lug on each of said arms and extending towards and overlapping the lug of the other of said arms,
    and registering holes in said lugs through which said shaft freely extends, said nut threaded on the second threaded section of the shaft bearing against said lugs.

7. A brake unit as claimed in claim 1 in which said guide pin extends parallel to said operator bar and slidably fits in said tube and has an outer end extending outwardly from the brake members adjacent the outer end of the operator bar, and connector means interconnecting the outer ends of the guide pin and the operator bar.

* * * * *